United States Patent
Sakakibara et al.

[11] Patent Number: 5,268,924
[45] Date of Patent: Dec. 7, 1993

[54] BOTTOM STRUCTURE FOR A DC ELECTRIC ARC FURNACE

[75] Inventors: Hidetsugu Sakakibara, Handa; Tsutomu Takahashi, Toyoake, both of Japan

[73] Assignee: Daidotokushuko Kabushikikaisha, Japan

[21] Appl. No.: 846,120

[22] Filed: Mar. 5, 1992

[30] Foreign Application Priority Data

Mar. 5, 1991 [JP] Japan .................. 3-063881
May 30, 1991 [JP] Japan .................. 3-155428

[51] Int. Cl.[5] ............................... F27D 1/00
[52] U.S. Cl. ........................... 373/72; 373/71; 373/101; 373/108
[58] Field of Search ............ 373/72, 108, 94–96, 373/71, 83, 101, 102

[56] References Cited

U.S. PATENT DOCUMENTS

| | | | |
|---|---|---|---|
| 941,419 | 11/1909 | Keller | 373/72 |
| 1,234,947 | 7/1917 | Sperling | 373/72 |
| 4,277,638 | 7/1981 | Stenkvist | 373/108 |
| 4,435,812 | 3/1984 | Guido et al. | 373/72 |
| 4,601,041 | 7/1986 | Muller | 373/72 |
| 4,628,516 | 12/1986 | Voss-Spilker et al. | 373/72 |
| 4,646,316 | 2/1987 | Michelet et al. | 373/72 |
| 4,685,112 | 8/1987 | Michelet et al. | 373/72 |
| 4,730,337 | 3/1988 | Schubert | 373/72 |
| 4,730,338 | 3/1988 | Guido | 373/72 |
| 4,754,464 | 6/1988 | Feuerstake | 373/72 |

OTHER PUBLICATIONS

Electrode Block for a DC Electric Furnace-Publication No. 1-128392. Published Japan May 22, 1989—pp. 507–509.

Bottom Structure-Publication No. 2-287090. Published Japan Nov. 27, 1990—pp. 597–601.

Primary Examiner—Bruce A. Reynolds
Assistant Examiner—Tu Hoang
Attorney, Agent, or Firm—William A. Drucker

[57] ABSTRACT

A refractory is laid on a base plate provided with a connector for the connection of a power source apparatus. Many electrode pins are inserted through the refractory and fixed in the base plate at their lower ends. The base plate is made of a steel upper plate member and a copper lower plate member overlapped one on the other and the lower end portions of the many electrode pins are electrically connected to the lower plate member through the upper plate member. When a DC electric arc furnace is operated, the electric current supplied to the connector reaches all the electrode pins mainly through the lower plate member in the base plate and flows from there homogeneously through the pins into the molten metal pool in the furnace.

5 Claims, 3 Drawing Sheets

BOTTOM STRUCTURE FOR A DC ELECTRIC ARC FURNACE

BACKGROUND OF THE INVENTION

1. Field of the Invention

This invention relates to a bottom structure of a DC electric arc furnace.

2. Description of the Prior Art

A bottom structure for a DC electric arc furnace is constructed as follows. Refractories are laid on a steel base plate having sufficient mechanical strength. On the base plate is provided a connector for the connection of a power supply. Many thin electrode pins are mounted through the refractories and all the lower ends of the electrode pins are secured in the base plate. The thin electrode pins are used in order that the upper end portions of the pins may be less eroded by a molten metal pool in the furnace when the DC electric arc furnace is operated. Furthermore, a lot of electrode pins are used so that a sufficient electric current may be supplied to the molten metal pool in the furnace through the respective thin electrode pins.

When the DC electric arc furnace is operated, the electric current supplied by the power source flows to the many electrode pins from the above mentioned connector through the base plate and further to the molten metal pool in the furnace through the electrode pins. The furnace bottom structure of this type is disclosed, for example, in Japanese published unexamined patent applications No. 1-128392 and No. 2-287090.

The electric resistance of the above mentioned base plate, however, is relatively large since it is made of steel. Consequently, there appears a problem that a large electric current, which is to be supplied via the many electrode pins, does not flow so much through the electrode pins away from the connector but much of the electric current flows concentrically through the electrode pins close to the connector. Thus there is a problem that the concentration of electric current on some particular electrode pins increases the heat in the conductors carrying much of the electric current and may be a cause of bringing about an accident to melt the electrode pins. In order to prevent the concentration of electric current, it is considered to make the above mentioned base plate of copper. The base plate, however, reaches a high temperature when the furnace is operated. Then enough mechanical strength is not obtained with the copper base plate. Namely, it is another problem that the copper base plate can not bear the weight of the refractories and the molten metal pool over them.

SUMMARY OF THE INVENTION

A first object of the present invention is to provide that bottom structure for a DC electric arc furnace in which the electric current from a power source can be supplied to a molten metal pool in the furnace through many electrode pins when the DC electric arc furnace is operated.

A second object of the present invention is to provide that bottom structure for a DC electric arc furnace in which when the electric current is to be supplied through the many electrode pins it can be dispersed homogeneously in them.

According to the present invention, a base plate is an overlapped structure of a steel plate member and a copper one. Accordingly, the electric current supplied by the power source flows mainly through the copper plate member of small electric resistance and then is dispersed homogeneously through the many electrode pins. As a result, the present invention affords safety to prevent such an accident to melt some electrode pins due to the concentration of electric current on these electrode pins as would be probable in the case of the aforementioned prior art.

A third object of the present invention is to provide that bottom structure for a DC electric arc furnace which can have sufficient mechanical strength even though the base plate reaches a high temperature when the DC electric arc furnace is operated.

According to the present invention, the base plate is the overlapped structure of the steel plate member and the copper one as is described above. Accordingly, sufficient mechanical strength is maintained by the steel plate member even at the high temperature.

A fourth object of the present invention is to provide that bottom structure for a DC electric arc furnace in which the base plate is the overlapped structure of the steel plate member and the copper one but the electrode pins are adapted to be electrically connected with ease to the copper plate member.

According to the present invention, the steel plate member is put upwards and the copper one downwards. It is difficult to connect the electrode pins to the upper plate member since the refractories of the furnace are laid on this plate member. The connection of the electrode pins to the copper plate member, however, is easy since this plate member is put downwards and is exposed to the outside of the furnace.

A fifth object of the present invention is to provide that bottom structure for a DC electric arc furnace in which the high heat radiation of the electrode pins is available.

According to the present invention, the copper plate member is exposed to the outside of the bottom side of the furnace. Moreover, the electrode pins are connected to this copper plate member. Copper is superior to steel in thermal conduction. Accordingly, the heat conducting in the electrode pins from the molten metal pool to the lower end of the pins can be effectively radiated from the copper plate member which is a good heat conductor and is besides exposed to the atmosphere.

A sixth object of the present invention is to provide that bottom structure for a DC electric arc furnace in which part of the base plate is made of copper less heat-resistive than steel but the probability of bringing about such an accident as to melt the copper part can be reduced.

In the DC electric arc furnace including the many electrode pins, these pins and the base plate supporting them are cooled by the wind sent by an air-cooling apparatus mounted under the bottom of the furnace. When a trouble occurs in such an air-cooling apparatus, the temperature at the lower surface of the refractories in the bottom of the furnace rises to a value close to the melting point of copper. Even in this situation, the spontaneous radiation to the atmosphere is available since the copper plate member according to the present invention is exposed to the atmosphere as mentioned before. Furthermore, the steel plate member provided over the copper one conducts less heat to the latter member from the refractories since the steel plate member is inferior in thermal conduction to copper. For these reasons, the copper plate member is kept at a relatively low temperature and is prevented from being molten.

DESCRIPTION OF THE PREFERRED EMBODIMENTS

Figure 1:
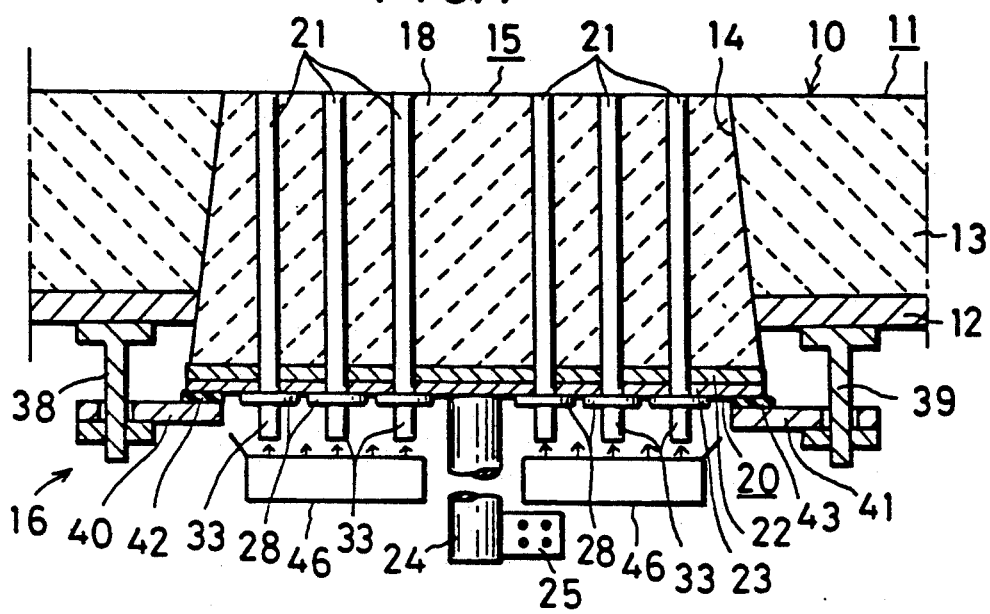
FIG. 1 is a longitudinal section of the bottom of a DC electric arc furnace.

In FIG. 1, a bottom 10 of a DC electric arc furnace consists of a body 11 formed, at the central portion thereof, with a through hole 14 and an electrode block 15 mounted in the through hole 14. The through hole 14 is tapered so that the upper portion is the thinner and the plane view of it is circular. The form of the electrode block 15 is a tapered one conforming to the form of the through hole 14. The electrode block 15 is mounted detachably in the through hole 14 and is fixed by a fixing unit 16.

The body 11 consists of a steel shell 12 and refractories 13 laid upon it.

Figure 2:
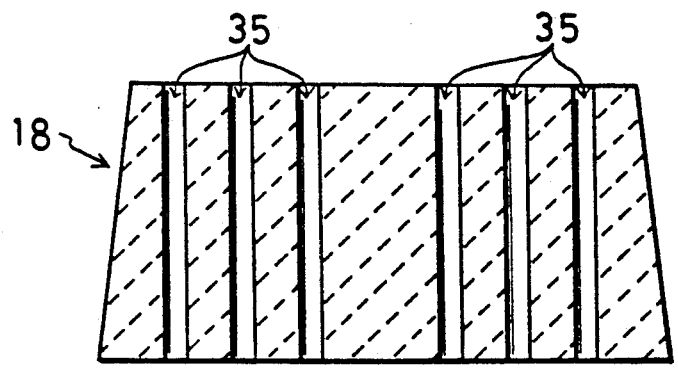
FIG. 2 is a longitudinal section of a formed refractory of the furnace.
Figure 3:
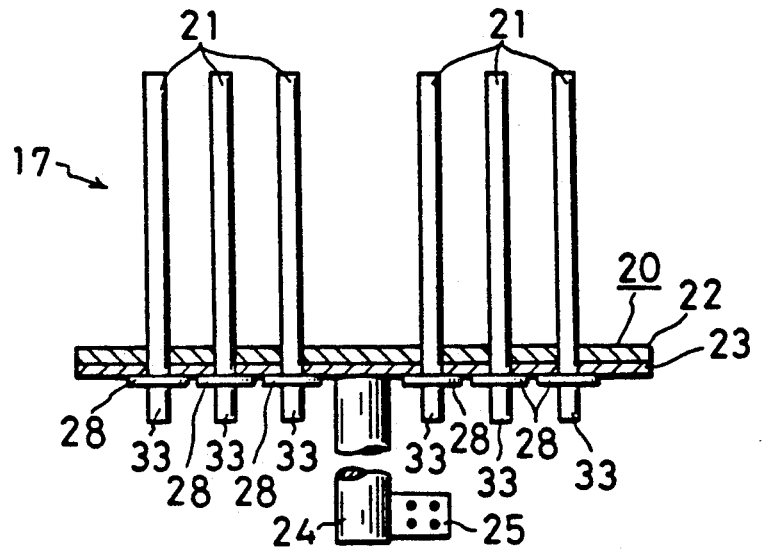
FIG. 3 is a longitudinal section of an electrode assembly.

The electrode block 15 consists of an electrode assembly 17 shown in FIG. 3 and a refractory 18 shown in FIG. 2. The electrode assembly 17 includes a base plate 20 and many electrode pins 21 mounted in it. The base plate 20 is an overlapped two-layer structure of a steel upper plate member 22 and a copper lower one 23. In this embodiment, the upper and lower plate members are firmly unified since the base plate 20 is made of a explosion-clad plate, a steel plate with a copper plate which is pressed onto one side of the steel plate by the explosion-clad method. The unification by the explosion-clad method is very firm since the both plates adhere to each other at their junction surfaces with minor irregularities. Accordingly, the both plates are difficult to be separated from each other even though the base plate 20 is repeatedly heated and cooled as the result of repeated operations of the furnace. The upper plate member 22 and the lower one 23 may be unified by any other method. These members may be only laid one on the other without being unified. A copper connector 24 is mounted in the central portion of the lower plate member 23 by welding. The connector may be mounted by a bolting unit similar to such a mounting structure for the electrode pins 21 as is described hereinafter. The connector 24 is provided with a terminal plate 25, which is connected to the positive output terminal of a power source apparatus for the DC electric arc furnace.

Figure 4:
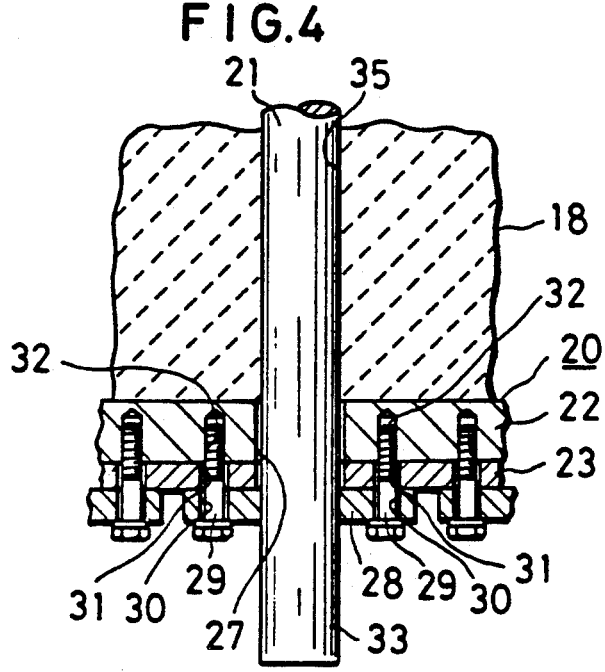
FIG. 4 is an enlarged longitudinal section showing the connection of the electrode pin to a base plate in details.

The above mentioned electrode pins 21 are all made of steel. They may be made of a different material in other cases. These electrode pins 21 are arranged along radial directions around the axis of the connector 24. Each electrode pin 21 is detachably mounted in the base plate 20 by a structure as shown in FIG. 4. The base plate 20 is formed, through the upper plate member 22 and the lower one 23 thereof, with through holes 27, in each of which the electrode pin 21 is inserted. A circular flange 28 made of the same material as that of the pin 21 is secured on the lower end portion of the electrode pin 21 by welding. The flange 28 is fastened to the base plate 20 by a bolt 29 and the upper surface of the flange 28 is pressed onto the lower surface of the lower plate member 23. Accordingly, the (contact) electric resistance between the lower plate member 23 and the flange 28 is very small. The bolt 29 is inserted in a through hole 30 in the flange 28 and a through hole 31 in the lower plate member 23 and is in threaded engagement with a threaded hole 32 in the upper plate member 22. Namely, the flange 28 is electrically connected to the copper lower plate member 23 as is described above but is mechanically fixed to the steel upper plate member 22. Accordingly, the members 28 and 22 are strongly fixed. Such portion 33 of the electrode pin 21 as protruding downwards under the flange 28 functions as a radiator.

The refractory 18 is constructed as a formed body. The external side shape of the formed refractory is tapered with the thinner upper portion thereof. A lot of perforations 35 to insert the electrode pins 21 therethrough are formed in the formed refractory 18 and are arranged in the same pattern as that of the electrode pins 21. The formed refractory 18 can be produced by charging a refractory raw material into a mold and forcing the raw material in, for example, by vibration or stamp.

Various types of fixtures are used as the fixing unit 16. In the present embodiment, support rods 38 and 39 are secured on the lower surface of the shell 12 by welding. Support plates 40 and 41 are screwed to these support rods 38 and 39, respectively. The support plates 40 and 41 push the base plate 20 of the electrode block 15 upwards via electrically insulating members 42 and 43.

An air-cooling box 46 is disposed under the electrode block 15 as is well known. The air-cooling box 46 is adapted to cool the radiating portions 33 of the electrode pins 21 and the base plate 20 by cooling fluid such as air blown out from many nozzle holes provided in the top side of the air-cooling box 46.

When the DC electric arc furnace is operated, the molten metal pool present in the furnace is received on the upper surface of the refractories 13 and 18. The DC electric current supplied by the power source apparatus flows to the molten metal pool along the following path. Namely, the electric current reaches the positions of the electrode pins 21 from the connector 24 mainly through the lower plate member 23 in the base plate 20. In this case, the voltage drop across the lower plate member 23 conducting the DC electric current is small since the electric resistance of the copper lower plate member 23 is small. The DC electric current having passed the lower plate member 23 flows to the flange 28 of each electrode pin 21 through the contact surface between the lower plate member 23 and the flange 28. The voltage drop at the contact surface is small since the electric resistance there is small as is described before. The DC electric current having reached the flange 28 flows upwards through the electrode pins 21 to the above mentioned molten metal pool. The DC electric current supplied by the power source apparatus and entering the connector 24 is dispersed homogeneously in the many electrode pins 21 since the electric resistance in the lower plate member 23 and that at the contact surface between the lower plate member 23 and the flange 28 are both small.

When the DC electric current flows in the above mentioned manner, the electric resistance at the contact surface between the lower plate member 23 and the flange 28 is small and therefore there is no possibility of the excessive temperature rise at the surface or of an accident caused there by a spark.

When the DC electric arc furnace is operated, there appears a difference in thermal expansion between the electrode pin 21 and the refractory 18. The inside diameter of the perforation 35 in the refractory 18, however, is made slightly larger than the outside diameter of the electrode pin 21 so that the electrode pin 21 can be inserted into and pulled out of the perforation 35. Consequently, the difference in thermal expansion is absorbed in the slight gap between the perforation and the electrode pin and the damage of the electrode block 15 due to the difference in thermal expansion can be prevented.

While the DC electric arc furnace is repeatedly operated, the refractory 18 in the electrode block 15 and the electrode pin 21 are eroded gradually from the top portions thereof by the molten metal pool. If the depth of erosion amounts to a certain large value, the operation of the DC electric arc furnace is stopped and the electrode block 15 is replaced with a new one in the following manner. The new electrode block 15 for replacement is prepared at a place under the bottom 10 of the DC electric arc furnace. If the electrode assembly 17 and the formed refractory 18 are disconnected and carried separately to the place, the weight of members to be carried is halved and the transport of the electrode block 15 to the place becomes easy. In the next place, the support plates 40 and 41 are dismounted from the support rods 38 and 39, respectively and the old electrode block 15 is pulled out downwards from the through hole 14. Next, the new electrode block 15 is mounted. Namely, the formed refractory 18 is laid on the base plate 20 so that the many electrode pins 21 may be inserted in respective perforations 35. Next, the new electrode block 15 is inserted into the through hole 14 from the lower side of it. Then the support plates 40 and 41 are again mounted and the new electrode block 15 is fixed. Furthermore, if any gap is present between the inside surface of the through hole 14 and the outside surface of the refractory 18 in the electrode block 15, a castable refractory is stuffed in the gap. Thus the work of replacing the electrode blocks 15 is finished.

Figure 5:
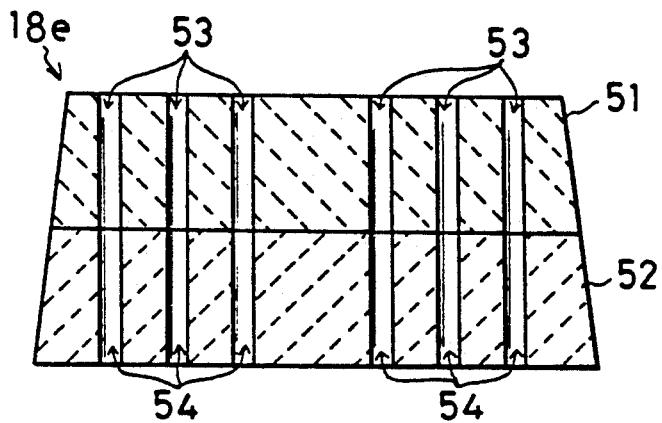
FIG. 5 is a longitudinal section showing a different embodiment of the formed refractory.

In the next place, a different embodiment of the structure of the formed refractory is shown in FIG. 5. The formed refractory in the present embodiment consists of two separated elements, an upper element 51 and a lower one 52 and an integral refractory 18e is made by laying one element on the other. The both elements 51 and 52 are formed with perforations 53 and 54 to insert the electrode pins therethrough so that a pair of perforations 53 and 54 form a longer continuous perforation.

Those members in FIG. 5 which are considered to be the same as or equivalent to those in the previous figures in view of function are given the same reference numerals with an alphabet "e" as those in the previous figures and the explanation of the members is not repeated. (Some of the members in the following figures are given similar reference numerals with an alphabet "f" or "g" and the explanation of the members is omitted.)

Figure 6:
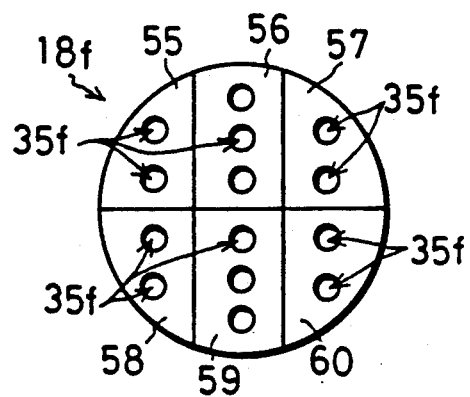
FIG. 6 is a longitudinal section showing a still different embodiment of the formed refractory and FIG. 7 is a longitudinal section of a different embodiment of the bottom structure for the DC electric arc furnace.

In the next place, a still different embodiment of the structure of the formed refractory is shown in FIG. 6. The formed refractory in the present embodiment consists of six elements 55 through 60 separated in the transverse directions and an integral formed refractory 18f is made by putting them together. The elements 55 through 60 are formed with respective perforations 35f to insert the electrode pins therethrough.

Figure 7:
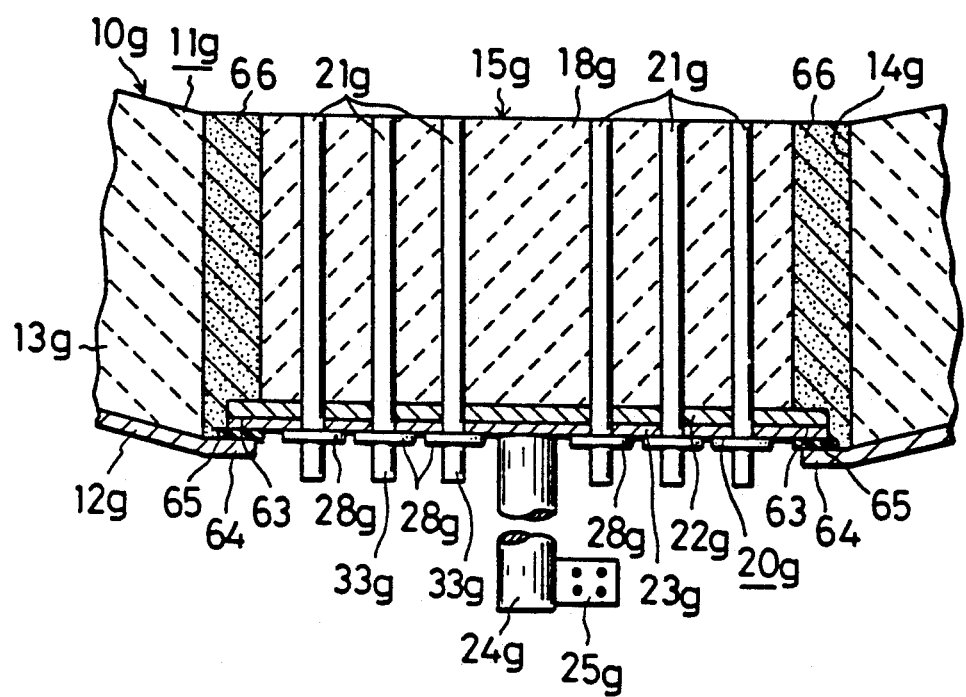

In the next place, another embodiment of the electrode block which is different in the external form thereof and in the structure to mount the block to the body of the bottom is shown in FIG. 7. The electrode block 15g in the present embodiment is made in the form of a straight circular cylinder. The electrode block 15g includes an outward overhang 63 provided on the periphery of the base plate 20g. The electrode block 15g of this type is mounted to the body 11g of the bottom of the furnace in the following manner. The electrode block 15g is brought down from the inside of the furnace into the through hole 14g in the body 11g and the overhang 63 is put over an inward overhang 64 provided on the shell 12g with an electrical insulator 65 sandwiched therebetween. A castable refractory 66 is puffed between the inside surface of the through hole 14g and the outside surface of the electrode block 15g.

Next, the other embodiment is explained. The electrode block 15 shown in aforementioned FIG. 1 or the one 15g shown in FIG. 7 may be an electrode block made by unifying the electrode assembly and the refractory. Namely, the electrode block may be one made by puffing a refractory around a lot of electrode pins provided in the base plate and by unifying the refractory and a lot of electrode pins. Furthermore, the external side form of the refractory may be tapered with the thinner lower portion thereof.

What is claimed is:

1. A bottom structure for a DC electric arc furnace comprising:
   (a) a base plate having a steel upper plate member and a copper lower plate member, said copper lower plate member has a lower surface and an upper surface overlapping said steel upper plate member and integral with said upper plate member by explosion cladding,
   (b) a connector connecting a power source apparatus to said base plate,
   (c) a refractory having a top surface disposed on said base plate, said refractory adapted to receive, at said top surface thereof, a molten metal pool, and
   (d) a plurality of electrode pins inserted longitudinally in said refractory and secured in said base plate at the ends thereof remote from said top surface, the ends of said electrode pins remote from said top surface electrically connected to said copper lower plate member through said steel upper plate member, said ends of said pins remote from said top surface of said refractory being inserted through said copper lower plate member, and
   (e) flanges having upper surfaces pressing onto the lower surface of said lower plate member.

2. A bottom structure for a DC electric arc furnace as set forth in claim 1 wherein the lower ends of said electrode pins protrude downwards from said base plate and function as radiators.

3. A bottom structure for a DC electric arc furnace comprising:
   (a) a body having, in the central portion thereof, a through hole and an electrode block detachably mounted in said through hole, (b) a base plate having a steel upper plate member and a copper lower plate member overlapping said upper plate member,
(c) a connector for the connection of a power source apparatus,
(d) a plurality of electrode pins having lower ends, said lower ends secured in said base plate and electrically connected to said copper lower plate member through said steel upper plate member, and
(e) a formed refractory having a plurality of perforations for insertion of said plurality of electrode pins through said perforations, said formed refractory being disposed on said base plate with said electrode pins inserted in said perforations.

4. A bottom structure for a DC electric arc furnace as set forth in claim 3 wherein said formed refractory has an external side, said external side of said formed refractory being tapered and having a thinner upper end.

5. A bottom structure for a DC electric arc furnace as set forth in claim 3 wherein said formed refractory includes plural non-integral members.

* * * * *